(12) United States Patent
Arimilli et al.

(10) Patent No.: US 10,216,653 B2
(45) Date of Patent: Feb. 26, 2019

(54) PRE-TRANSMISSION DATA REORDERING FOR A SERIAL INTERFACE

(71) Applicant: INTERNATIONAL BUSINESS MACHINES CORPORATION, Armonk, NY (US)

(72) Inventors: Lakshminarayana Baba Arimilli, Austin, TX (US); Yiftach Benjamini, Givat Ela (IL); Bartholomew Blaner, Shelburne, VT (US); Daniel M. Dreps, Georgetown, TX (US); John David Irish, Rochester, MN (US); David J. Krolak, Rochester, MN (US); Lonny Lambrecht, Bryon, MN (US); Michael S. Siegel, Raleigh, NC (US); William J. Starke, Round Rock, TX (US); Jeffrey A. Stuecheli, Austin, TX (US); Kenneth M. Valk, Rochester, MN (US); Curtis C. Wollbrink, Rochester, MN (US)

(73) Assignee: International Busiess Machines Corporation, Armonk, NY (US)

( * ) Notice: Subject to any disclaimer, the term of this patent is extended or adjusted under 35 U.S.C. 154(b) by 0 days.

(21) Appl. No.: 15/723,949

(22) Filed: Oct. 3, 2017

(65) Prior Publication Data
US 2018/0095905 A1 Apr. 5, 2018

Related U.S. Application Data

(60) Provisional application No. 62/403,233, filed on Oct. 3, 2016.

(51) Int. Cl.
*G06F 13/16* (2006.01)
*G06F 13/42* (2006.01)
*G06F 3/06* (2006.01)

(52) U.S. Cl.
CPC .......... *G06F 13/1626* (2013.01); *G06F 3/061* (2013.01); *G06F 3/0611* (2013.01);
(Continued)

(58) Field of Classification Search
CPC ............. G06F 13/1626; G06F 13/1673; G06F 13/4291; G06F 13/4282; G06F 3/061; G06F 3/0611; G06F 2003/0691
See application file for complete search history.

(56) References Cited

U.S. PATENT DOCUMENTS

2008/0279224 A1* 11/2008 Pontius .................. H04L 25/14
370/503
2015/0003477 A1* 1/2015 Baeckler ................ H04L 12/40
370/503

(Continued)

*Primary Examiner* — Glenn A. Auve
(74) *Attorney, Agent, or Firm* — Brian F. Russell; Steven L. Bennett

(57) ABSTRACT

A serial communication system includes a transmitting circuit for serially transmitting data via a serial communication link including N channels where N is an integer greater than 1. The transmitting circuit includes an input buffer having storage for input data frames each including M bytes forming N segments of M/N contiguous bytes. The transmitting circuit additionally includes a reordering circuit coupled to the input buffer. The reordering circuit includes a reorder buffer including multiple entries. The reordering circuit buffers, in each of multiple entries of the reorder buffer, a byte in a common byte position in each of the N segments of an input data frame. The reordering circuit sequentially outputs the contents of the entries of the reorder buffer via the N channels of the serial communication link.

19 Claims, 8 Drawing Sheets

(52) U.S. Cl.
CPC ...... *G06F 13/1673* (2013.01); *G06F 13/4282* (2013.01); *G06F 13/4291* (2013.01); *G06F 2003/0691* (2013.01)

(56) References Cited

U.S. PATENT DOCUMENTS

2015/0301962 A1\* 10/2015 Laughton ............ G06F 13/1626 710/112
2017/0046101 A1\* 2/2017 Kersh ................... G06F 3/0604

\* cited by examiner

PRE-TRANSMISSION DATA REORDERING FOR A SERIAL INTERFACE

BACKGROUND OF THE INVENTION

The present invention relates to data processing and communication, and more specifically, to improved communication via a serial interface.

Serial interfaces are commonly employed in data processing systems to support communication between system components and input/output (I/O) or peripheral devices. Typically, data intended for transmission via the serial interface is received in units (frames) of one or more bytes, and these bytes are serialized into a stream of bits that is transmitted over the serial channel in bit order and byte order from a transmitting component to a receiving component. For example, if a frame containing four bytes is to be transmitted, bit 0 to bit 7 of the first byte is transmitted, followed by bit 0 to bit 7 of the second byte, followed by bit 0 to bit 7 of the third byte, and finally bit 0 to bit 7 of the fourth byte. The receiving component may then deserialize the serial stream of bits to reassemble the original frame.

BRIEF SUMMARY

In at least one embodiment, a serial communication system includes a transmitting circuit for serially transmitting data via a serial communication link including N channels where N is an integer greater than 1. The transmitting circuit includes an input buffer having storage for input data frames each including M bytes forming N segments of M/N contiguous bytes. The transmitting circuit additionally includes a reordering circuit coupled to the input buffer. The reordering circuit includes a reorder buffer including multiple entries. The reordering circuit buffers, in each of multiple entries of the reorder buffer, a byte in a common byte position in each of the N segments of an input data frame. The reordering circuit sequentially outputs the contents of the entries of the reorder buffer via the N channels of the serial communication link.

DETAILED DESCRIPTION

Figure 1:
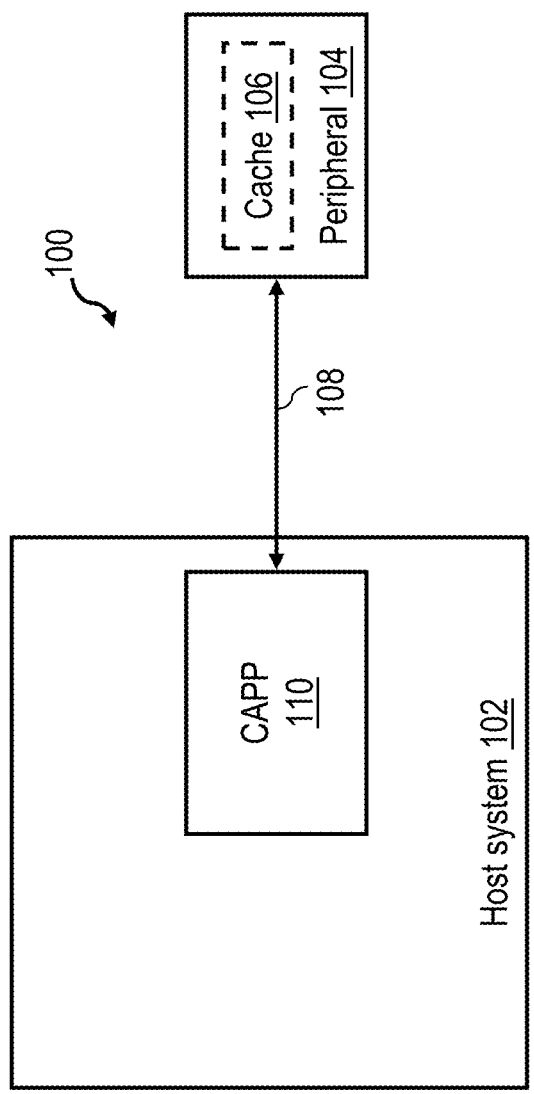
FIG. 1 is a high level block diagram of an exemplary data processing system in which a coherent device participates with a primary coherent system across a serial communication link through a proxy.

With reference now to the figures and with particular reference to FIG. 1, there is illustrated a high level block diagram of an exemplary data processing system 100 including a serial communication link. As shown, data processing system 100 includes a host system 102, which in one embodiment is a coherent multiprocessor computer system in which coherency of a distributed shared memory is maintained by implementation of a coherency protocol, such as the well-known MESI protocol or a variant thereof. In various embodiments, the coherency protocol can be directory-based or snoop-based.

As shown, the functionality of host system 102 can be expanded by coupling a peripheral component 104 to host system 102 by a serial communication link 108, which in some embodiments may include multiple lanes (i.e., individual 1-bit or multibit serial channels). In one example, peripheral component 104 may be implemented with a field programmable gate array (FPGA), application specific integrated circuit (ASIC), or other general or special-purpose processor or system. In some embodiments, peripheral component 104 may, for example, serve as a co-processor that off-loads predetermined processing tasks from host system 102, provide low cost expansion of the general-purpose processing capabilities or storage capacity of data processing system 100, and/or provide an interface to a heterogeneous system external to host system 102. In support of these and other possible functions of peripheral component 104, peripheral component 104 may include a cache 106 that holds local copies of memory blocks in the coherent memory address space of host system 102 to enable low latency access to those memory blocks by peripheral component 104.

In many cases, the technology utilized to implement peripheral component 104, cache 106, and/or serial communication link 108 has insufficient speed, bandwidth and/or reliability to guarantee that peripheral component 104 can participate in the determination of the system-wide coherency responses for memory access requests within the bounded time frame required by the coherency protocol of host system 102. Accordingly, host system 102 may further include a coherent attached processor proxy (CAPP) 110 that participates on behalf of peripheral component 104 in the determination of the system-wide coherency responses for peripheral component 104 within a timeframe that satisfies the timing requirements of the coherency protocol of host system 102. Although not required, it is preferable if CAPP 110 is programmable and can therefore be programmed to support any of multiple different peripheral components 104 to which host system 102 may be coupled by serial communication link 108.

Figure 2:
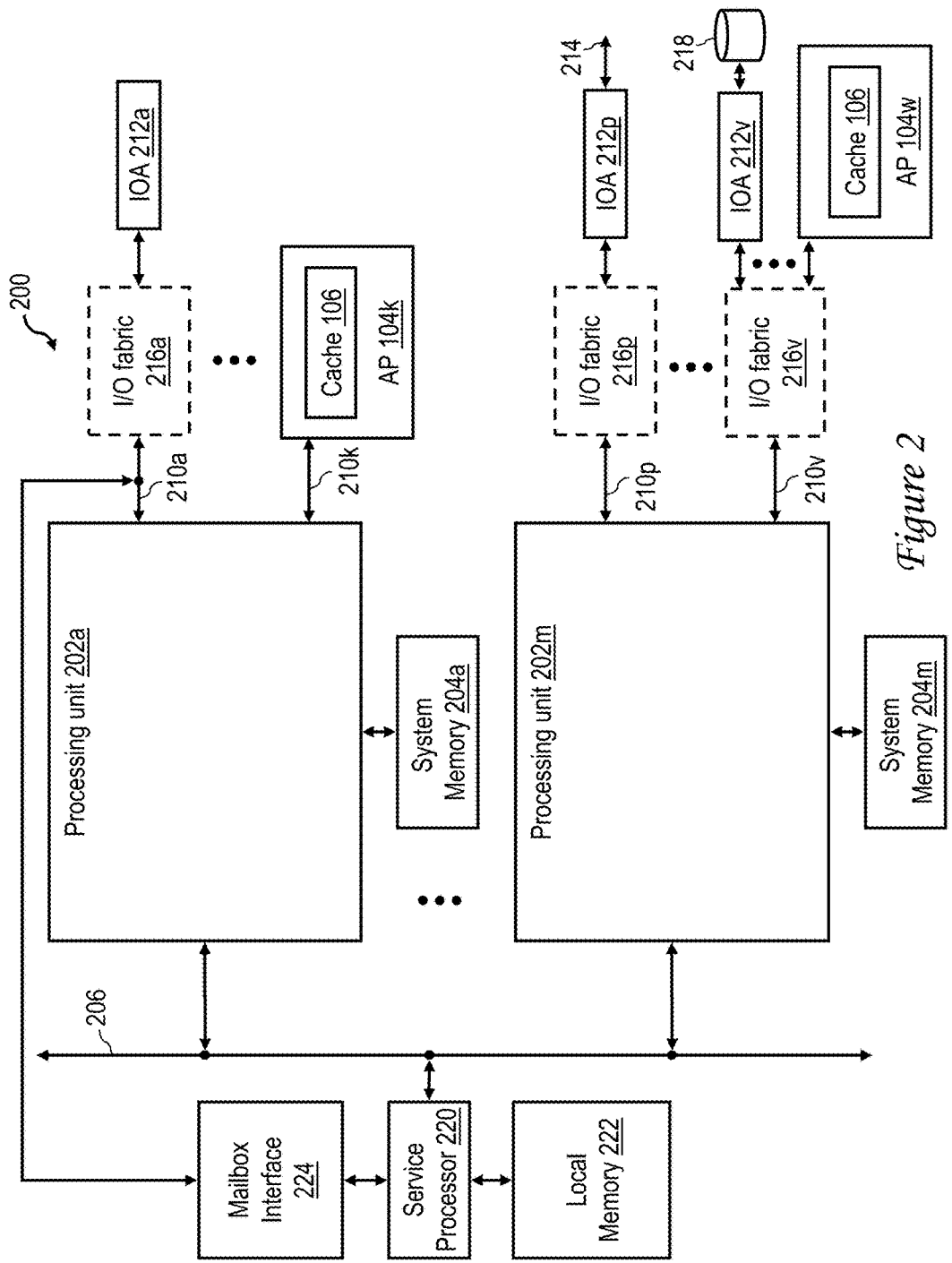
FIG. 2 is a more detailed block diagram of an exemplary embodiment of the data processing system of FIG. 1.

Referring now to FIG. 2, there is depicted a more detailed block diagram of a data processing system 200 that is one of the numerous possible embodiments of data processing system 100 of FIG. 1. Data processing system 200 may be implemented, for example, with one of the IBM POWER servers, a product line of International Business Machines Corporation of Armonk, N.Y.

In the depicted embodiment, data processing system 200 is a distributed shared memory multiprocessor (MP) data processing system including a plurality of processing units 202*a*-202*m*. Each of processing units 202*a*-202*m* is supported by a respective one of shared system memories 204*a*-204*m*, the contents of which may generally be accessed by any of processing units 202*a*-202*m*. Processing units 202*a*-202*m* are further coupled for communication to a system fabric 206, which may include one or more bused, switched and/or wireless communication links. The communication on system fabric 206 includes memory access requests by processing units 202 requesting coherent access to various memory blocks within various shared system memories 204a-204m.

As further shown in FIG. 2, one or more of processing units 204a-204m are further coupled to one or more communication links 210 providing expanded connectivity. For example, processing units 202a and 202m are respectively coupled to communication links 210a-210k and 210p-210v, which may be implemented, for example, with Peripheral Component Interconnect express (PCIe) local buses. As shown, communication links 210 can be utilized to support the direct or indirect coupling of input/output adapters (IOAs) such as IOAs 212a, 212p and 212v, which can be, for example, network adapters, storage device controllers, display adapters, peripheral adapters, etc. For example, IOA 212p, which is network adapter coupled to an external data network 214, is coupled to communication link 210p optionally through an I/O fabric 216p, which may comprise one or more switches and/or bridges. In a similar manner, IOA 212v, which is a storage device controller that controls storage device 218, is coupled to communication link 210v optionally through an I/O fabric 216v. As discussed with reference to FIG. 1, communication links 210 can also be utilized to support the attachment of one or more peripheral components 104, either directly to a processing unit 202 (as is the case for attached processor (AP) 104k, which is coupled to processing unit 202a by communication link 210k) or indirectly to a processing unit 202 through an intermediate I/O fabric 216 (as can be the case for AP 104w, which can be coupled to processing unit 202m through communication link 210v and optional I/O fabric 216v).

Data processing system 200 further includes a service processor 220 that manages the boot process of data processing system 200 and thereafter monitors and reports on the performance of and error conditions detected in data processing system 200. Service processor 220 is coupled to system fabric 206 and is supported by a local memory 222, which may include volatile (e.g., dynamic random access memory (DRAM)) and non-volatile memory (e.g., non-volatile random access memory (NVRAM) or static random access memory (SRAM)). Service processor 220 is further coupled to a mailbox interface 224 through which service processor 220 communicates I/O operations with communication link 210a.

Those of ordinary skill in the art will appreciate that the architecture and components of a data processing system can vary between embodiments. For example, other devices and interconnects may alternatively or additionally be used. Accordingly, the exemplary data processing system 200 given in FIG. 2 is not meant to imply architectural limitations with respect to the claimed invention.

Figure 3:
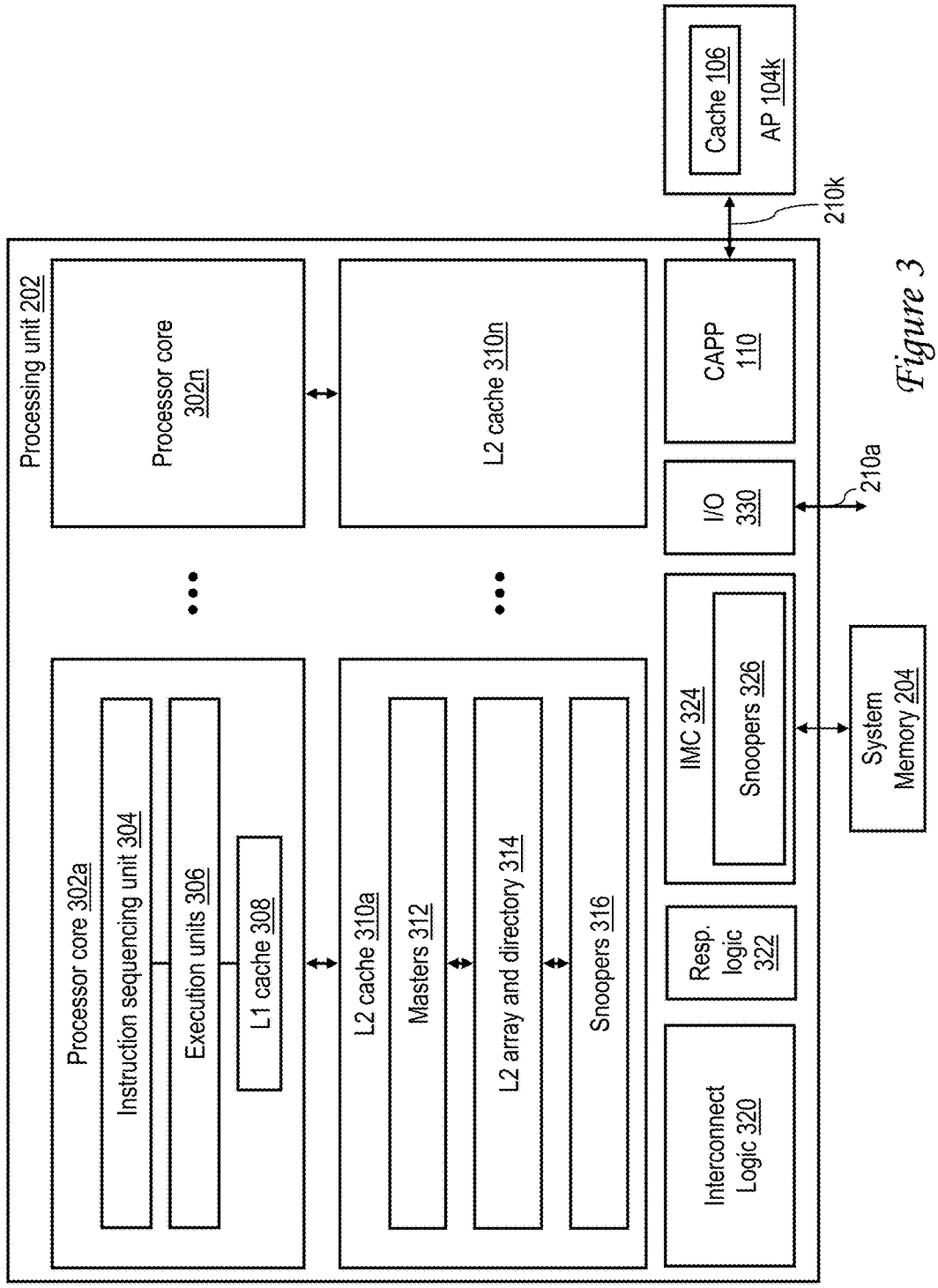
FIG. 3 is a more detailed block diagram of an exemplary embodiment of a processing unit in the data processing system of FIG. 2.

With reference now to FIG. 3, there is illustrated a more detailed block diagram of an exemplary embodiment of a processing unit 202 in data processing system 200 of FIG. 2. In the depicted embodiment, each processing unit 202 is preferably realized as a single integrated circuit chip having a substrate in which semiconductor circuitry is fabricated as is known in the art.

Each processing unit 202 includes multiple processor cores 302a-302n for independently processing instructions and data. Each processor core 302 includes at least an instruction sequencing unit (ISU) 304 for fetching and ordering instructions for execution and one or more execution units 306 for executing instructions. The instructions executed by execution units 306 may include, for example, fixed and floating point arithmetic instructions, logical instructions, and instructions that request read and write access to a memory block in the coherent address space of data processing system 200.

The operation of each processor core 302a-302n is supported by a multi-level volatile memory hierarchy having at its lowest level one or more shared system memories 204 (only one of which is shown in FIG. 3) and, at its upper levels, one or more levels of cache memory. As depicted, processing unit 202 includes an integrated memory controller (IMC) 324 that controls read and write access to an associated system memory 204 in response to requests received from processor cores 302a-302n and operations received on system fabric 206.

In the illustrative embodiment, the cache memory hierarchy of processing unit 202 includes a store-through level one (L1) cache 308 within each processor core 302a-302n and a store-in level two (L2) cache 310. As shown, L2 cache 310 includes an L2 array and directory 314, masters 312 and snoopers 316. Masters 312 initiate transactions on system fabric 206 and access L2 array and directory 314 in response to memory access (and other) requests received from the associated processor cores 302. Snoopers 316 detect operations on system fabric 206, provide appropriate responses, and perform any accesses to L2 array and directory 314 required by the operations. Although the illustrated cache hierarchy includes only two levels of cache, those skilled in the art will appreciate that alternative embodiments may include additional levels (L3, L4, etc.) of private or shared, on-chip or off-chip, in-line or lookaside cache, which may be fully inclusive, partially inclusive, or non-inclusive of the contents the upper levels of cache.

As further shown in FIG. 3, processing unit 202 includes integrated interconnect logic 320 by which processing unit 202 is coupled to system fabric 206, as well as an instance of response logic 322, which in embodiments employing snoop-based coherency, implements a portion of a distributed coherency messaging mechanism that maintains coherency of the cache hierarchies of processing unit 202. Processing unit 202 further includes one or more integrated I/O (input/output) controllers 330 (e.g., PCI host bridges (PHBs)) supporting I/O communication via one or more communication links 210. Processing unit 202 additionally includes a CAPP 110 as previously described.

Those skilled in the art will appreciate that data processing system 200 can include many additional or alternative components. Because such additional components are not necessary for an understanding of the present invention, they are not illustrated in FIG. 3 or discussed further herein.

Figure 4:
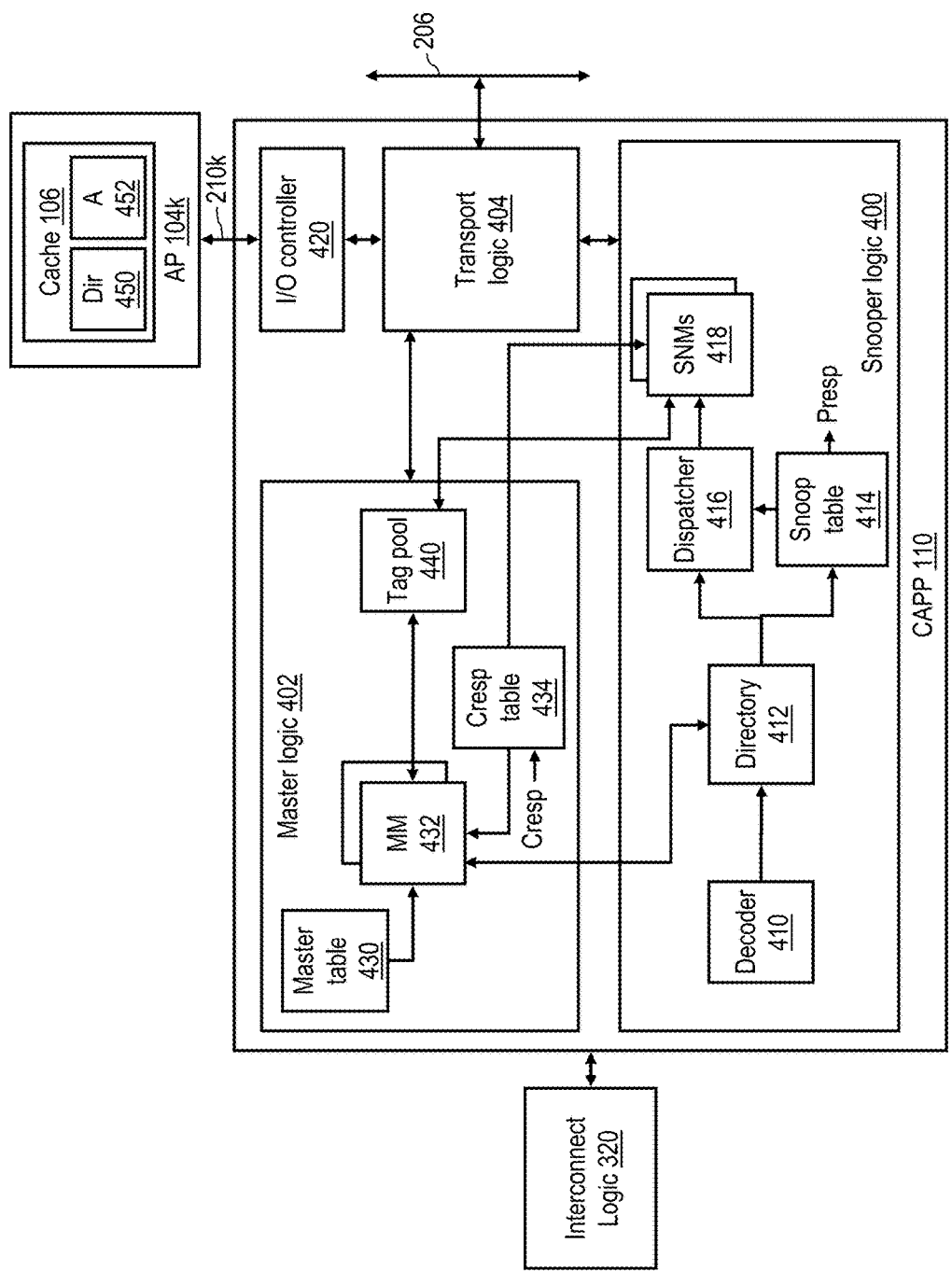
FIG. 4 is a more detailed block diagram of an exemplary embodiment of the coherent attached processor proxy (CAPP) in the processing unit of FIG. 3.

Referring now to FIG. 4, there is depicted a more detailed block diagram of an exemplary embodiment of the coherent attached processor proxy (CAPP) 110 in processing unit 202 of FIG. 3. As shown, CAPP 110 is coupled to interconnect logic 320 to permit CAPP 110 to transmit and receive address, control and coherency communication via system fabric 206 on behalf of (i.e., as a proxy for) a peripheral component 104 (e.g., AP 104k) to which it is coupled by a serial communication link (e.g., serial communication link 210k).

CAPP 110 includes snooper logic 400, master logic 402, transport logic 404, and an I/O controller 420. Transport logic 404 has two interfaces, a first by which transport logic 404 manages communication over serial communication link 210k as necessary to comport with the signaling protocol employed by serial communication link 210k and/or AP 104k, and a second by which transport logic 404 manages data communication with system fabric 206. Thus, transport logic 404 may packetize data, may apply message encapsulation/decapsulation or encryption/decryption, may compute, append and/or verify checksums, etc., as is known in the art.

I/O controller 420 controls serial communication with AP 104k via serial communication link 210k. In various embodiments, serial communication link 210k may include multiple (e.g., 4, 8 or 16) physical serial communication channels (lanes). In some implementations, one or more of these physical serial communication channels may be (or can be configured by I/O controller 420 and/or AP 104k to be) simplex or duplex. In some embodiments, I/O controller 420 and/or AP 104k can selectively configure the number of the physical serial communication channels that are available for use to less than the total number of physical serial communication channels within serial communication link 210k (e.g., so that 4 of 8 serial channels are used). Further, in some embodiments, I/O controller 420 and/or AP 104k can selectively configure a frequency of communication over the physical serial communication channels within serial communication link 210k.

Snooper logic 400 includes a decoder 410, a directory 412 of the contents of the data array 452 of the cache 106 of the associated AP 104k, a snoop table 414, a dispatcher 416, and a set of snoop machines (SNMs) 418. Decoder 410 of snooper logic 400 receives memory access requests from system fabric 206 via interconnect logic 320 and optionally but preferably decodes the snooped memory access requests into a corresponding set of internal snoop requests. The set of internal snoop requests implemented by decoder 410 is preferably programmable (and in some embodiments dynamically reprogrammable) to decouple the design of CAPP 110 from that of AP 104k and to allow flexibility in mapping the memory access requests of host system 102 to the request set of the associated AP 104k. Following decoding by decoder 410, the target address specified by the memory access request is utilized to access directory 412 in order to look up the coherence state of the target address with respect to AP 104k. It should be noted that the coherence state indicated by directory 412 may not match or correspond to that indicated by directory 450 of cache 106 in AP 104k. Nevertheless, the use of the coherence state information in directory 412 in CAPP 110 rather than directory 450 enables the system-wide coherency response to be determined for each memory access request within a bounded time frame determined by host system 102 to be met, regardless of whether serial communication link 210k and/or AP 104k have lower speed or reliability than other components of data processing system 200 (e.g., CAPP 110).

The coherence state specified by directory 412 and the internal request determined by decoder 410 are then utilized by snoop table 414 to determine an appropriate partial response (Presp) to the snooped memory access request. In response to at least the internal snoop request determined by decoder 410, coherence state output by directory 412 and Presp output by snoop table 414, dispatcher 416 determines whether or not any further action is or may possibly be required in response to the memory access request (e.g., update of directory 412, sourcing the target cache line to the requester, etc.), and if so, dispatches a snoop machine 418 to manage performance of that action.

Master logic 402 optionally but preferably includes a master table 430 that maps memory access and other requests originated by AP 104k and received by CAPP 110 to internal master requests. As with the mapping performed by decoder 410 of snooper logic 400, the mapping performed by master table 430 decouples the design of CAPP 110 and AP 104k and enables CAPP 110 to programmably support a wide variety of diverse peripheral components 104. In at least some embodiments, master table 430 supports dynamic reprogramming. Master logic 402 further includes a set of master machines (MMs) 432 that services internal master requests output by master table 430. In a typical case, a master machine 432 allocated to service an internal master request determines and manages an action to be performed to service the internal request (e.g., initiating a directory update and/or memory access request on system fabric 206) based at least in part on the coherence state indicated for the target address of the master request by directory 412. Data transfers to and from AP 104k via CAPP 110 in response to the operation of snooper logic 400 and master logic 402 are tracked via operation tags allocated from tag pool 440.

As further indicated in FIG. 4, master logic 402 includes a combined response (Cresp) table 434. In response to receipt of a combined response representing the systemwide coherence response to a request, Cresp table 434 translates the combined response received from system fabric 206 into an internal Cresp message and distributes the internal Cresp message to master machines 432 and snoop machines 418. Again, the translation of combined responses to internal Cresp messages by Cresp table 434 decouples the design of AP 104k from that of host system 102 and enables the interface provided by CAPP 110 to be programmable and thus support a variety of diverse peripheral components 104.

As noted above, several data structures (e.g., decoder 410, snoop table 414, master table 430 and Cresp table 434) within CAPP 110 are preferably programmable, and in some embodiments, dynamically programmable. In one implementation, a control processor (e.g., service processor 220 or any of processing units 202 running supervisory code (e.g., hypervisor)) dynamically updates the data structures by first instructing AP 104 to invalidate its directory 450 and quiesce. The control processor then updates one or more of the data structures within CAPP 110. In response to completion of the updates, the control processor instructs AP 104 to resume normal processing. It should also be noted that the configurations of master table 430 and snoop table 414 affects not only the mapping (translation) of incoming AP requests and snooped requests, respectively, but also the behavior of MMs 432 and SNMs 418. That is, the behavior of MMs 432 in response to AP requests and the messages transmitted on system fabric 206 and to AP 104 are also preferably determined by the configuration of master table 430. Similarly, the behavior of SNMs 418 in response to snooped requests and the messages transmitted on system fabric 206 and to AP 104 are preferably determined by the configuration of snoop table 414. Thus, the behaviors and messages of MMs 432 and SNMs 418 can be selectively changed by appropriate reprogramming of master table 430 and snoop table 414.

Figure 5:
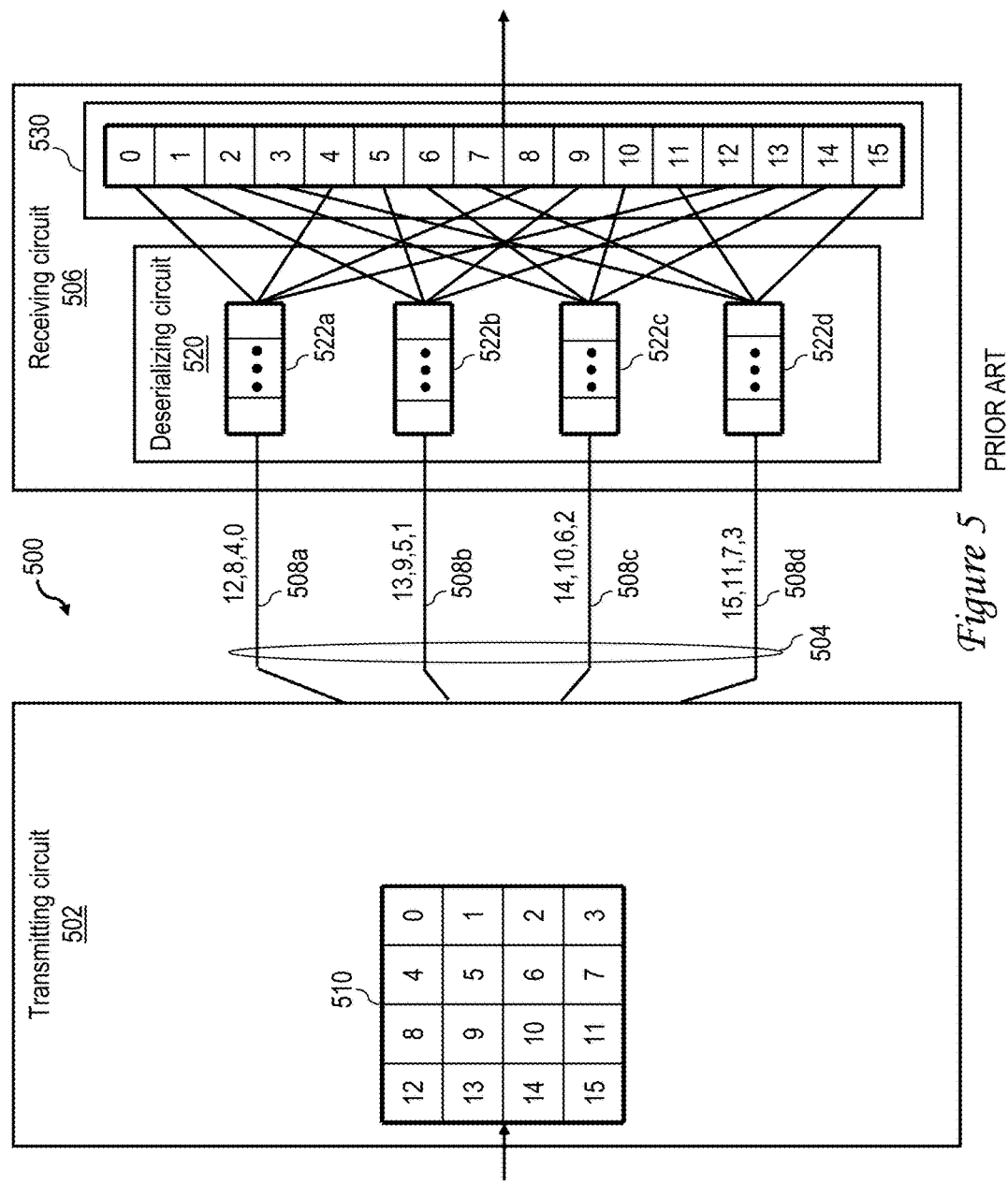
FIG. 5 is a block diagram of a serial interface in accordance with the prior art.

With reference now to FIG. 5, there is depicted a block diagram of a prior art serial interface 500. Serial interface 500 includes a transmitting circuit 502 and a receiving circuit 506 coupled from communication by a serial communication link 504. As shown, transmitting circuit 502 includes an input buffer 510 that receives and buffers a data frame including M bytes of data, which in this example is two 8-byte data words, but in other implementations could include any desired number of data bytes (e.g., 4 bytes, 8 bytes, etc.). In this example, input buffer 510 receives the data frame over 4 cycles, with bytes 0-3 being received at time t0, bytes 4-7 being received at time t1, bytes 8-11 being received at time t2, and bytes 12-15 being received at time t3.

In this example, transmitting circuit 502 transmits the data bytes buffered within input buffer 510 to receiving circuit 506 via multiple channels (also referred to as lanes) 508a-508d forming communication link 504. As shown, in the prior art, when the data width of communication link 504 is less than the size of the data to be transmitted, transmitting circuit 502 transmits the data to receiving circuit 506 strictly in byte and bit order. Thus, transmitting circuit 502 first transmits bytes 0 to 3 via channels 508d-508d, respectively, following by bytes 4 to 7, followed by bytes 8 to 11, and finally by bytes 12 to 15.

Receiving circuit 506 includes a deserializing circuit 520 and an output buffer 530. Deserializing circuit 520 includes a plurality of receive buffers 522 (e.g., receive buffers 522a-522d), which are each coupled to receive data bytes transmitted on a respective one of channels 508a-508d. As depicted in FIG. 5, deserializing circuit 520 employs the illustrated wiring to reorder the bytes of the data frame received in receive buffers 522 in output buffer 530 to reform the original data frame. Output buffer 530 can then output the data frame for further processing and/or storage.

Under the assumption that wire delays are negligible, the wiring complexity exhibited in receiving circuit 506 of FIG. 5 has no impact on communication performance via serial interface 500. However, in actual implementations, this assumption is not valid, and communication performance via a serial interface is dependent on not only wire delays, but also on the relative operating clock frequencies and minimum sizes of transmitting circuit 502 and receiving circuit 506. In particular, in cases in which transmitting circuit has a higher operating clock frequency and a smaller minimum line size than receiving circuit, the present invention recognizes that it would be desirable to reorder the data bytes transmitted via the serial interface within the transmitting circuit in order to reduce and/or minimize the aggregate wire lengths required in the receiving circuit to reassemble a data frame.

Figure 6:
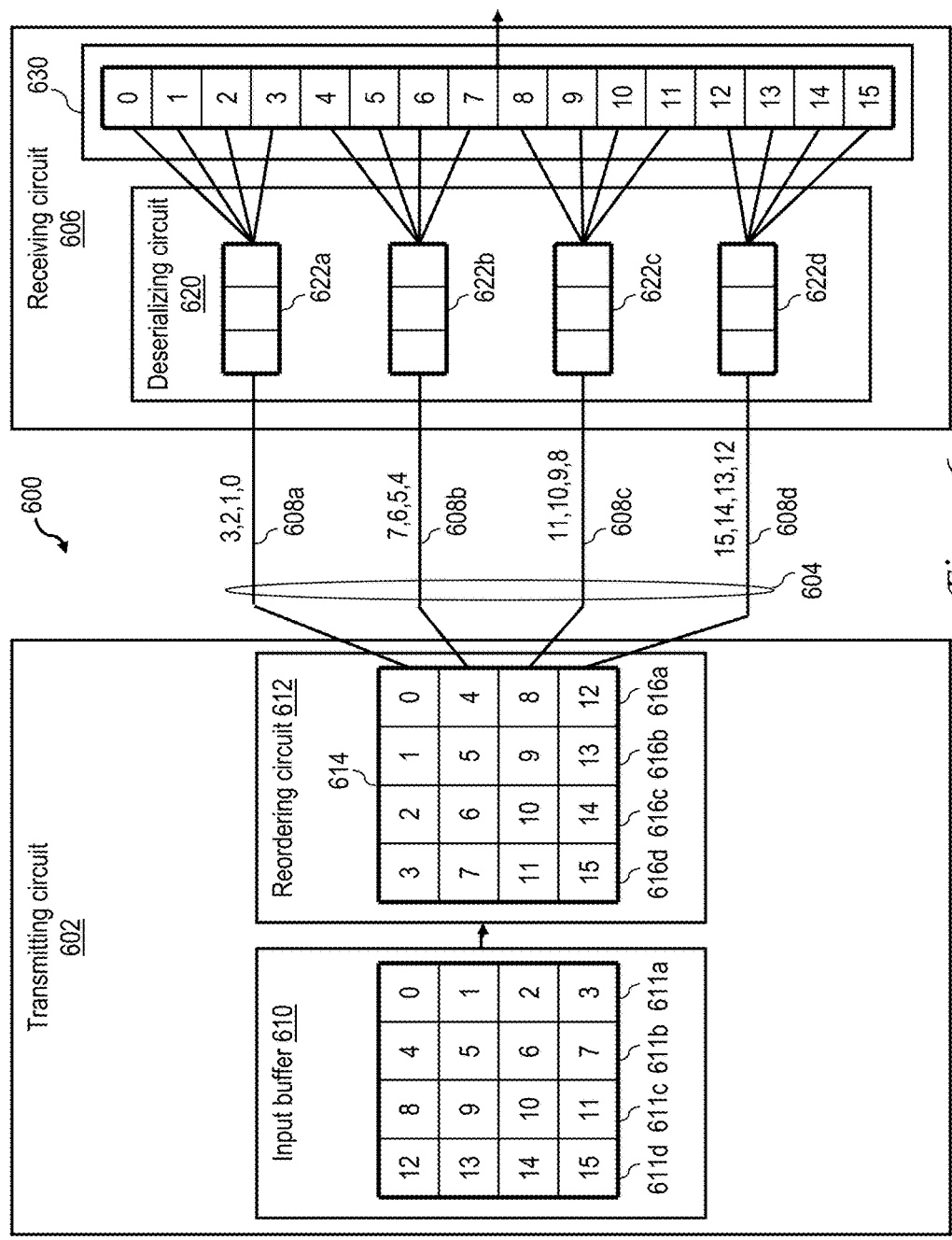
FIG. 6 is a block diagram of a serial interface in accordance with one embodiment of the present invention.

Referring now to FIG. 6, there is depicted a detailed block diagram of a serial interface 600 in accordance with one embodiment of the present invention. In the depicted embodiment, serial interface 600 includes a transmitting circuit 602 and a receiving circuit 606 coupled for communication by a serial communication link 604. In the following discussion, serial interface 600 is described with receiving circuit 606 implemented in AP 104k and with transmitting circuit 602 implemented in CAPP 110 (e.g., within I/O controller 420), which generally is implemented in integrated circuit having a higher operating clock frequency and smaller line size (i.e., minimum feature size) than utilized to implement AP 104k. For example, in some implementations, the clock ratios of transmitting circuit 602 to receiving circuit 606 may be, for example, 2:1, 4:1, 8:1, etc. Further, in some embodiments, serial communication link 604 may be simplex, while in other embodiments, serial communication link 604 can be duplex.

Serial communication link 604 includes multiple channels (or lanes), which in this embodiment include four channels 608a-608d. In other embodiments, serial communication link 604 may include a number of channels N that is greater than or equal to 2 and less than the length M in bytes of the data packets to be transmitted over serial communication link 604.

As shown, transmitting circuit 602 includes an input buffer 610 that receives and buffers a frame including M bytes of data, which in this exemplary embodiment is 16 bytes, but in other embodiments could include any desired number of data bytes (e.g., 4 bytes, 8 bytes, etc.). It is generally preferred, however, if M is evenly divisible by an integer N greater than one. The M bytes of data within each frame form a number N of segments 611a-611d each including S contiguous bytes, where S is an integer greater than 1 and is equal to M/N. In this case, input buffer 610 receives the data frame over 4 cycles, with segment 611a (e.g., bytes 0-3) being received at time t0, segment 611b (e.g., bytes 4-7) being received at time t1, segment 611c (e.g., bytes 8-11) being received at time t2, and segment 611d (e.g., bytes 12-15) being received at time t3.

Transmitting circuit 602 additionally includes a reordering circuit 612 coupled to receive data from input buffer 610. Reordering circuit 612 includes a reorder buffer 614 having a depth D (i.e., a number of entries 616a-616d), which is preferably greater than or equal to S. Each of the plurality of entries 616a-616d has a width in bytes equal to N, the number of channels 608 in serial communication link 604. In some embodiments, reordering circuit 612 advances data from entry 616d to entry 616c to entry 616b to entry 616a and then transmits the data of entry 616a on channels 608. In other embodiments, reordering circuit 612 is instead configured as a multi-ported structure, allowing data to be inserted into or transmitted from multiple of (e.g., any of) entries 616.

Reordering circuit 612 reorders the bytes of data frames received from input buffer 610 in non-sequential order. That is, as shown, reorder buffer 614 does not buffer the 16 bytes of an input data frame with entry 616a buffering bytes 0-3, entry 616b buffering bytes 4-7, entry 616c buffering bytes 8-11, and entry 616d buffering bytes 12-15, such that the individual bytes of the data frame are transmitted in the same sequence in which they appear in the data frame. Instead, reordering circuit 612 reorders the data bytes of the input data frame according to per-segment byte order so that each channel 608 of serial communication link 604 transmits only the bytes of a respective one of the M/N segments of the input data frame and so that the same byte position of all segments of the input data frame are transmitted via channels 608a-608d at the same time. Thus, in this example, reordering circuit 612 buffers in entry 616a the first byte of each segment 611 (i.e., bytes 0, 4, 8 and 12), buffers in entry 616b the second byte of each segment (i.e., bytes 1, 5, 9 and 13), buffers in entry 616c the third byte of each segment (i.e., bytes 2, 6, 10, and 14), and buffers in entry 616d the fourth byte of each segment (i.e., bytes 3, 7, 11, and 15). As further shown in FIG. 6, reordering circuit 612 transmits via channels 608a-608d the first byte of all segments to receiving circuit 606 in a first beat, the second byte of all segments to receiving circuit 606 in a second beat, and so on.

Receiving circuit 606 includes a deserializing circuit 620 and an output buffer 630. Deserializing circuit 620 includes a plurality of receive buffers 622 (e.g., receive buffers 622a-622d), which are each coupled to receive data bytes transmitted on a respective one of channels 608a-608d. Each receive buffer 622 preferably has a depth of at least S−1, if S represents the number of bytes per segment. As depicted in FIG. 6, deserializing circuit 620 reassembles the segments of the data frame received in receive buffers 622 in output buffer 630 to reform the original data frame. Output buffer 630 can then output the data frame for further processing and/or storage.

By implementing the byte reordering performed by transmitting circuit 602 in processing unit 202 prior to transmission, performance is improved over prior art implementations that would instead perform the reordering in a peripheral component 104. Further, because the minimum line size of processing unit 202 is generally smaller than that of peripheral component 104, the circuit area utilized to implement the byte reordering functionality is generally less than if implemented in peripheral component 104.

In a preferred embodiment, reordering circuit 612 is configurable for different numbers of channels 608, different communication frequencies over serial communication link 604, and/or sizes of data frames. In some implementations, transmitting circuit 602 negotiates the number of channels 608 and the communication frequency of the channels 608 with receiving circuit 606 utilizing conventional techniques.

Figure 7:
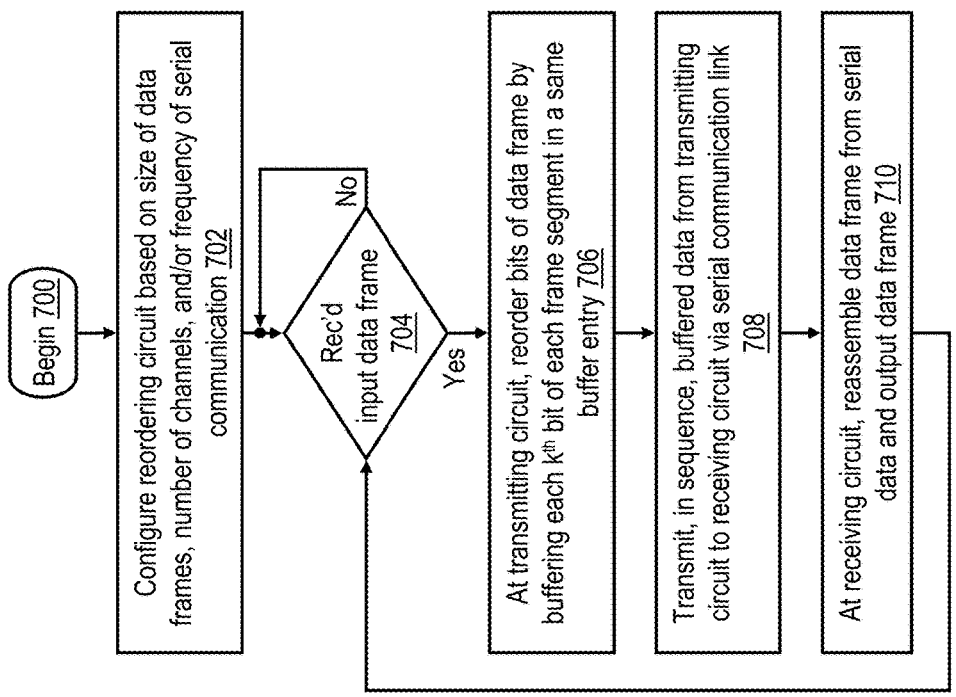
FIG. 7 is a high level logical flowchart of serial communication via a serial interface in accordance with one embodiment.

Referring now to FIG. 7, there is illustrated a high level logical flowchart of a method of serial communication in accordance with one embodiment. To promote understanding, the process of FIG. 7 will be described with reference to the embodiment of a serial interface shown in FIG. 6.

The process of FIG. 7 begins at block 700 and then proceeds to block 702, which illustrates transmitting circuit 602 configuring reordering circuit 612 based on the size of the data frames to be communicated, the number of channels 608 within the serial communication link 604, and/or the frequency of the serial communication via channels 608. In at least some embodiments, some of these parameters can be set by appropriately setting one or more configuration registers in transmitting circuit 602 via software and/or hardware. Further, in some embodiments, transmitting circuit 602 and receiving circuit 606 can jointly negotiate the number of channels 608 and the frequency of serial communication utilizing a conventional training communication sequence over serial communication link 604.

Following the configuration illustrated at block 702, transmitting circuit 602 awaits receipt of an input data frame in input buffer 610 (block 704). In response to receipt of an input data frame in input buffer 610, reordering circuit 612 reorders the bytes of the input data frame by buffering each $k^{th}$ byte of each frame segment together in the same entry 616 of reorder buffer 614 (block 706). In the example shown in FIG. 6 in which the data frame includes 4 segments (16 bytes divided by 4 channels yields 4 segments each containing 4 contiguous bytes of the input data frame), the first byte of each segment is buffered in entry 616a, the second byte of each segment is buffered in entry 616b, the third byte of each segment is buffered in entry 616c, and the fourth byte of each segment is buffered in entry 616d.

Block 708 illustrates transmitting circuit 602 sequentially transmitting the data buffered within reorder buffer 614 to receiving circuit 606 via serial communication link 604 in multiple beats, where the initial beat includes the first data byte of each segment of the input data frame, the second beat includes the second data byte of each segment, and so son. Receiving circuit 606 receives the data transmitted on channels 608 in receive buffers 622 and deserializes the data by reassembling the input data frame in output buffer 630 (block 710). It should be noted that each receive buffer 622 only receives data byte within a respective one of the plurality of segments of the input data frame, simplifying the wiring and logic utilized to reconstruct the data frame. Once reassembled, the data frame is output from output buffer 630, for example, for storage or further processing.

As indicated in FIG. 7 by the process returning to block 704, the serial communication process can be performed iteratively for a plurality of input data frames. It should be appreciated, however, that given the available buffering, a second data frame can be received and at least partially buffered within reorder buffer 614 prior to the conclusion of transmission of the data of a first data frame.

Figure 8:
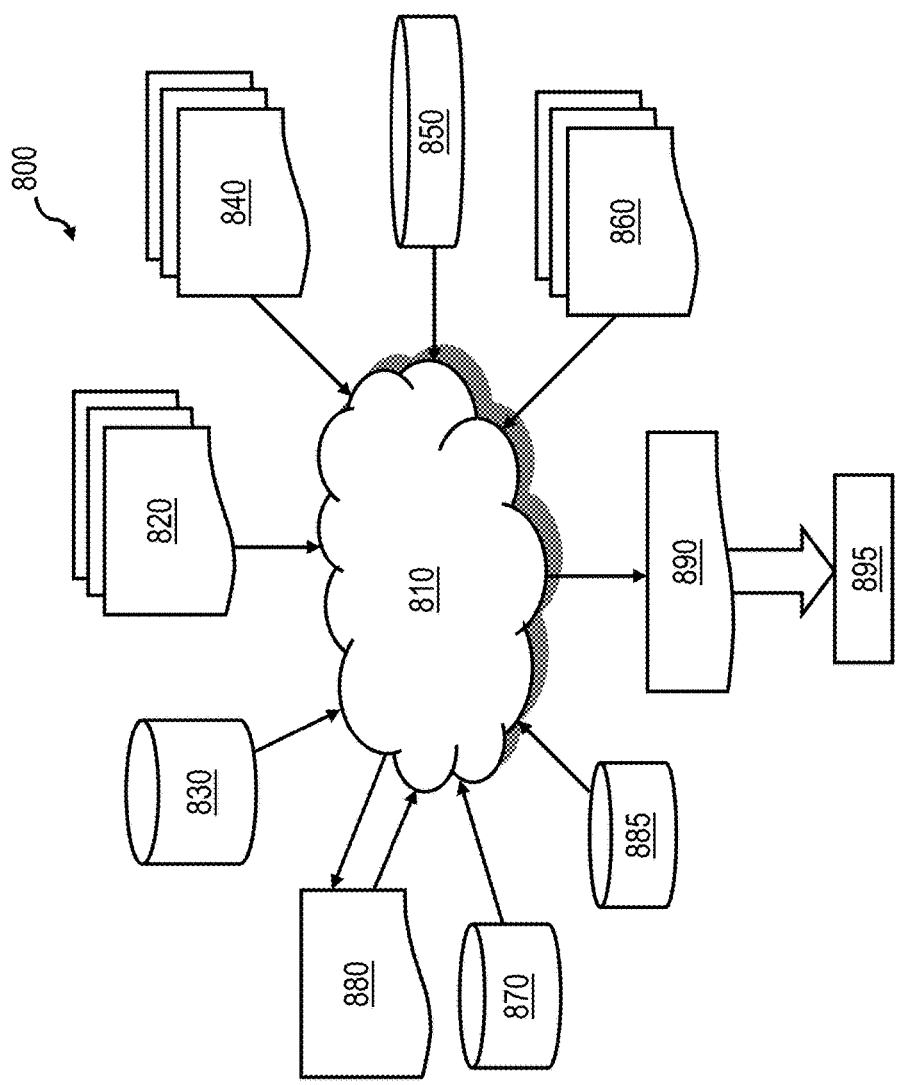
FIG. 8 is a data flow diagram of an exemplary design process.

With reference now to FIG. 8, there is illustrated a block diagram of an exemplary design flow 800 used for example, in semiconductor IC logic design, simulation, test, layout, and manufacture. Design flow 800 includes processes, machines and/or mechanisms for processing design structures or devices to generate logically or otherwise functionally equivalent representations of the design structures and/or devices described above. The design structures processed and/or generated by design flow 800 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 800 may vary depending on the type of representation being designed. For example, a design flow 800 for building an application specific IC (ASIC) may differ from a design flow 800 for designing a standard component or from a design flow 800 for instantiating the design into a programmable array, for example a programmable gate array (PGA) or a field programmable gate array (FPGA) offered by Altera® Inc. or Xilinx® Inc.

FIG. 8 illustrates multiple such design structures including an input design structure 820 that is preferably processed by a design process 810. Design structure 820 may be a logical simulation design structure generated and processed by design process 810 to produce a logically equivalent functional representation of a hardware device. Design structure 820 may also or alternatively comprise data and/or program instructions that when processed by design process 810, generate a functional representation of the physical structure of a hardware device. Whether representing functional and/or structural design features, design structure 820 may be generated using electronic computer-aided design (ECAD) such as implemented by a core developer/designer. When encoded on a machine-readable data transmission, gate array, or storage medium, design structure 820 may be accessed and processed by one or more hardware and/or software modules within design process 810 to simulate or otherwise functionally represent an electronic component, circuit, electronic or logic module, apparatus, device, or system such as those illustrated herein. As such, design structure 820 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 810 preferably employs and incorporates hardware and/or software modules for synthesizing, translating, or otherwise processing a design/simulation functional equivalent of the components, circuits, devices, or logic structures shown herein to generate a netlist 880 which may contain design structures such as design structure 820. Netlist 880 may comprise, for example, compiled or otherwise processed data structures representing a list of wires, discrete components, logic gates, control circuits, I/O devices, models, etc. that describes the connections to other elements and circuits in an integrated circuit design. Netlist 880 may be synthesized using an iterative process in which netlist 880 is resynthesized one or more times depending on design specifications and parameters for the device. As with other design structure types described herein, netlist 880 may be recorded on a machine-readable storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, or buffer space.

Design process 810 may include hardware and software modules for processing a variety of input data structure types including netlist 880. Such data structure types may reside, for example, within library elements 830 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 840, characterization data 850, verification data 860, design rules 870, and test data files 885 which may include input test patterns, output test results, and other testing information. Design process 810 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 810 without deviating from the scope and spirit of the invention. Design process 810 may also include modules for performing standard circuit design processes such as timing analysis, verification, design rule checking, place and route operations, etc.

Design process 810 employs and incorporates logic and physical design tools such as HDL compilers and simulation model build tools to process design structure 820 together with some or all of the depicted supporting data structures along with any additional mechanical design or data (if applicable), to generate a second design structure 890. Design structure 890 resides on a storage medium or programmable gate array in a data format used for the exchange of data of mechanical devices and structures (e.g., information stored in a IGES, DXF, Parasolid XT, JT, DRG, or any other suitable format for storing or rendering such mechanical design structures). Similar to design structure 820, design structure 890 preferably comprises one or more files, data structures, or other computer-encoded data or instructions that reside on transmission or data storage media and that when processed by an ECAD system generate a logically or otherwise functionally equivalent form of one or more of the embodiments of the invention shown herein. In one embodiment, design structure 890 may comprise a compiled, executable HDL simulation model that functionally simulates the devices shown herein.

Design structure 890 may also employ a data format used for the exchange of layout data of integrated circuits and/or symbolic data format (e.g., information stored in a GDSII (GDS2), GL1, OASIS, map files, or any other suitable format for storing such design data structures). Design structure 890 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown herein. Design structure 890 may then proceed to a stage 895 where, for example, design structure 890: proceeds to tape-out, is released to manufacturing, is released to a mask house, is sent to another design house, is sent back to the customer, etc.

As has been described, in at least one embodiment, a serial communication system includes a transmitting circuit for serially transmitting data via a serial communication link including N channels where N is an integer greater than 1. The transmitting circuit includes an input buffer having storage for input data frames each including M bytes forming N segments of M/N contiguous bytes. The transmitting circuit additionally includes a reordering circuit coupled to the input buffer. The reordering circuit includes a reorder buffer including multiple entries. The reordering circuit buffers, in each of multiple entries of the reorder buffer, a byte in a common byte position in each of the N segments of an input data frame. The reordering circuit sequentially outputs the contents of the entries of the reorder buffer via the N channels of the serial communication link.

While various embodiments have been particularly shown as described with reference to a preferred embodiment, it will be understood by those skilled in the art that various changes in form and detail may be made therein without departing from the spirit and scope of the claims. For example, although aspects have been described with respect to a computer system executing program code that directs the functions of the present invention, it should be understood that present invention may alternatively be implemented as a program product including a storage device (e.g., volatile or non-volatile memory, optical or magnetic disk or other statutory manufacture) that stores program code that can be processed by a data processing system. As employed herein, a "storage device" is specifically defined to include only statutory articles of manufacture and to exclude energy per se, transmission media per se, and transitory propagating signals per se. The Further, the term "coupled" as used herein is defined to encompass embodiments employing a direct electrical connection between coupled elements or blocks, as well as embodiments employing an indirect electrical connection between coupled elements or blocks achieved using one or more intervening elements or blocks. In addition, the term "exemplary" is defined herein as meaning one example of a feature, not necessarily the best or preferred example.

What is claimed is:

1. A serial communication system, comprising:
   a transmitting circuit for serially transmitting data via a serial communication link including N channels where N is an integer greater than 1, the transmitting circuit including:
      an input buffer having storage for input data frames each including M bytes forming N segments of M/N contiguous bytes;
      a reordering circuit coupled to the input buffer, wherein the reordering circuit includes a reorder buffer, and wherein the reordering circuit buffers, in each of multiple entries of the reorder buffer, a byte in a common byte position in each of the N segments of an input data frame, and wherein the reordering circuit sequentially outputs the contents of the entries of the reorder buffer via the N channels of the serial communication link.

2. The serial communication system of claim 1, and further comprising:
a receiving circuit coupled to the serial communication link, wherein the receiving circuit includes a deserializing circuit that reassembles input data frames from serial data received from the transmitting circuit via the serial communication link.

3. The serial communication system of claim 2, wherein the transmitting circuit has a higher clock frequency than the receiving circuit.

4. The serial communication system of claim 2, wherein:
the deserializing circuit includes N receive buffers; and
each of the N receive buffers receives only bytes of a respective one of the N segments.

5. The serial communication system of claim 4, wherein each of the N receive buffers has a depth of at least M/N−1.

6. The serial communication system of claim 1, wherein the reorder buffer has a depth of at least M/N.

7. A method of communication via a serial interface including a serial communication link including N channels where N is an integer greater than 1, the method comprising:
at a transmitting circuit including an input buffer and a reordering circuit including a reorder buffer, receiving in the input buffer an input data frame including M bytes forming N segments of M/N contiguous bytes;
in response to the receiving, the reordering circuit buffering, in each of multiple entries of the reorder buffer, a byte in a common byte position in each of the N segments of the input data frame; and
the reordering circuit sequentially outputting the contents of the entries of the reorder buffer via the N channels of the serial communication link.

8. The method of claim 7, and further comprising:
at a receiving circuit coupled to the serial communication link, reassembling the input data from serial data received from the transmitting circuit via the serial communication link.

9. The method of claim 8, wherein the transmitting circuit has a higher clock frequency than the receiving circuit.

10. The method of claim 8, and further comprising the receiving circuit receiving the serial data in N receive buffers, wherein each of the N receive buffers receives only bytes of a respective one of the N segments.

11. The method of claim 10, wherein each of the N receive buffers has a depth of at least M/N−1.

12. The method of claim 7, wherein the reorder buffer has a depth of at least M/N.

13. A design structure tangibly embodied in a storage device for designing, manufacturing, or testing an integrated circuit, the design structure comprising:
a transmitting circuit for serially transmitting data via a serial communication link including N channels where N is an integer greater than 1, the transmitting circuit including:
an input buffer having storage for input data frames each including M bytes forming N segments of M/N contiguous bytes;
a reordering circuit coupled to the input buffer, wherein the reordering circuit includes a reorder buffer, and wherein the reordering circuit buffers, in each of multiple entries of the reorder buffer, a byte in a common byte position in each of the N segments of an input data frame, and wherein the reordering circuit sequentially outputs the contents of the entries of the reorder buffer via the N channels of the serial communication link.

14. The design structure of claim 13, and further comprising:
a receiving circuit coupled to the serial communication link, wherein the receiving circuit includes a deserializing circuit that reassembles input data frames from serial data received from the transmitting circuit via the serial communication link.

15. The design structure of claim 14, wherein the transmitting circuit has a higher clock frequency than the receiving circuit.

16. The design structure of claim 14, wherein:
the deserializing circuit includes N receive buffers; and
each of the N receive buffers receives only bytes of a respective one of the N segments.

17. The design structure of claim 16, wherein each of the N receive buffers has a depth of at least M/N−1.

18. The design structure of claim 13, wherein the reorder buffer has a depth of at least M/N.

19. The design structure of claim 13, wherein the design structure comprises a hardware description language (HDL) design structure.

* * * * *